United States Patent
Sagong et al.

(10) Patent No.: US 12,217,454 B2
(45) Date of Patent: Feb. 4, 2025

(54) METHOD AND DEVICE WITH SENSING DATA PROCESSING

(71) Applicant: SAMSUNG ELECTRONICS CO., LTD., Suwon-si (KR)

(72) Inventors: Donghoon Sagong, Suwon-si (KR); Hojin Ju, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 369 days.

(21) Appl. No.: 17/698,266

(22) Filed: Mar. 18, 2022

(65) Prior Publication Data

US 2023/0128392 A1  Apr. 27, 2023

(30) Foreign Application Priority Data

Oct. 21, 2021 (KR) .................. 10-2021-0141142

(51) Int. Cl.
| | | |
|---|---|---|
| G06K 9/00 | (2022.01) | |
| G06T 7/73 | (2017.01) | |
| G06V 10/46 | (2022.01) | |
| G06V 10/764 | (2022.01) | |
| H04N 13/239 | (2018.01) | |
| H04N 13/271 | (2018.01) | |

(52) U.S. Cl.
CPC ............ *G06T 7/73* (2017.01); *G06V 10/46* (2022.01); *G06V 10/764* (2022.01); *H04N 13/239* (2018.05); *H04N 13/271* (2018.05)

(58) Field of Classification Search
CPC ......... G06T 7/73; G06V 10/46; G06V 10/764
See application file for complete search history.

(56) References Cited

U.S. PATENT DOCUMENTS

| | | | |
|---|---|---|---|
| 8,531,519 B1 * | 9/2013 | Peng | H04N 7/18 382/190 |
| 9,286,810 B2 | 3/2016 | Eade et al. | |
| 2011/0286631 A1 * | 11/2011 | Wagner | G06V 10/96 382/103 |

(Continued)

FOREIGN PATENT DOCUMENTS

| | | | |
|---|---|---|---|
| EP | 2977931 A1 * | 1/2016 | ......... G06K 9/00711 |
| JP | 2014-178241 A | 9/2014 | |

(Continued)

OTHER PUBLICATIONS

Video stitching using interacting multiple model based feature tracking, K. Krishnakumar et al., Springer, Aug. 11, 2017, pp. 1375-1397 (Year: 2017).*

(Continued)

*Primary Examiner* — Jayesh A Patel
(74) *Attorney, Agent, or Firm* — NSIP Law (57) ABSTRACT

A sensing data processing device is provided. The sensing data processing device may track keypoints within a full observable range of the sensing data processing device based on sensing data collected from a previous frame and a sensing data collected from a current frame through a reference sensor, the full observable range determined based on a combined field of view (FOV) of sensors, manage a new keypoint together with the keypoints in response to the new keypoint being detected, and perform localization of the device based on the managed keypoints.

21 Claims, 6 Drawing Sheets

(56) References Cited

U.S. PATENT DOCUMENTS

| | | | |
|---|---|---|---|
| 2014/0010407 A1* | 1/2014 | Sinha | G06T 7/73 |
| | | | 382/103 |
| 2015/0125045 A1* | 5/2015 | Gauglitz | G06T 7/246 |
| | | | 382/107 |
| 2015/0304634 A1 | 10/2015 | Karvounis | |
| 2017/0148186 A1* | 5/2017 | Holzer | G06T 7/337 |
| 2019/0347822 A1* | 11/2019 | Nash | G06T 7/73 |
| 2019/0364206 A1* | 11/2019 | Dal Mutto | H04N 23/90 |
| 2020/0300637 A1 | 9/2020 | Chiu et al. | |
| 2020/0401793 A1* | 12/2020 | Leung | G06V 10/147 |
| 2021/0034908 A1* | 2/2021 | Yonezawa | G06V 10/44 |
| 2021/0327092 A1* | 10/2021 | Jiang | H04N 13/282 |
| 2021/0365739 A1* | 11/2021 | Carmena | G06V 10/764 |
| 2022/0137636 A1 | 5/2022 | Yang et al. | |
| 2022/0284598 A1* | 9/2022 | Bhargava | G06V 20/48 |

FOREIGN PATENT DOCUMENTS

| | | | | |
|---|---|---|---|---|
| JP | 2020-030221 A | | 2/2020 | |
| JP | 2021-099278 A | | 7/2021 | |
| KR | 10-2011-0026600 A | | 3/2011 | |
| KR | 20110026600 A | * | 3/2011 | |
| KR | 10-2020-0095918 A | | 8/2020 | |
| WO | WO 2017/117675 A1 | | 7/2017 | |
| WO | WO-2021099178 A1 | * | 5/2021 | G06T 3/4038 |

OTHER PUBLICATIONS

On-Road Pedestrian Tracking Across Multiple Driving Recorders, Kuan-Hui Lee et al., IEEE, 2015, pp. 1429-1438 (Year: 2015).*

A survey on image and video stitching, Wei Lyu et al., 2018, pp. 55-83 (Year: 2018).*

Person Re-identification Using Masked Keypoints, Diego Reyes et al., Springer, 2018, pp. 45-56 (Year: 2018).*

Determination of Feature Generation Methods for PTZ Camera Object Tracking, Daniel D. Doyle et al., SPIE, 2012, pp. 1-12 (Year: 2012).*

Persistent Objects Tracking Across Multiple Non Overlapping Cameras, Jinman Kang et al., IEEE, 2005, pp. 1-8 (Year: 2005).*

Tracking of Multiple Objects Across Multiple Cameras with Overlapping and Non-Overlapping Views, LiangJia Zhu et al., IEEE, 2009, pp. 1056-1060 (Year: 2009).*

Tracking Objects as Points, Xingyi Zhou et al., Springer, 2020, pp. 474-490 (Year: 2020).*

Video object matching across multiple non-overlapping camera views based on multi-feature fusion and incremental learning, Huiyan Wang et al., Elsevier, 2014, pp. 3841-3851 (Year: 2014).*

Tracking Multiple Occluding People by Localizing on Multiple Scene Planes, Saad M. Khan et al., IEEE, 2019, pp. 505-519 (Year: 2019).*

Consistent Labeling of Tracked Objects in Multiple Cameras with Overlapping Fields of View, Sohaib Khan et al., IEEE, 2003, pp. 1355-1360 (Year: 2003).*

Human Tracking in Multiple Cameras, Sohaib Khan et al., IEEE, 2001, pp. 331-336 (Year: 2001).*

Campos, Carlos, et al. "Orb-Slam3: An Accurate Open-Source Library for Visual, Visual-Inertial, and Multi-Map Slam." *IEEE Transactions on Robotics* 37.6 (2021): arXiv:2007.11898v2 [cs.RO] Apr. 23, 2021 pp. 1-18 (18 pages in English).

So, Edmond Wai Yan, et al. "Divergent Stereo Visual Odometry for a Hopping Rover on an Asteroid Surface." *i-SAIRAS-International Symposium on Artificial Intelligence, Robotics and Automation in Space*. Sep. 1, 2010. pp. 904-911 (8 pages in English).

Meilland, Maxime, et al. "Dense visual mapping of large scale environments for real-time localisation." *2011 IEEE/RSJ International Conference on Intelligent Robots and Systems. IEEE*, 2011 (8 pages in English).

Jeong, Jaeheon, et al.. "Trinocular visual odometry for divergent views with minimal overlap." *2013 IEEE Workshop on Robot Vision (WORV). IEEE*, Jan. 2013. (9 pages in English).

Martínez-García, Edgar Alonso, et al. "4WD Robot Posture Estimation by Radial Multi-View Visual Odometry." *Applications of Mobile Robots. IntechOpen*, vol. 1 2018. pp. 1-22 ( 23 pages in English).

Pan, Janice Shuay-ann. Automotive Top-view Image Generation using Orthogonally Diverging Fisheye Cameras. Diss. May 2016. pp. 1-54 (65pages in English).

Mair, Elmar. Efficient and Robust Pose Estimation Based on Inertial and Visual Sensing. Diss. Technische Universität München, 2012, (272 pages).

Harmat, Adam, et al. "Multi-Camera Tracking and Mapping for Unmanned Aerial Vehicles in Unstructured Environments." Journal of Intelligent & Robotic Systems 78 (2015): 291-317.

Extended European search report issued on Jul. 26, 2023, in counterpart European Patent Application No. 22184156.2 (27 pages).

* cited by examiner

METHOD AND DEVICE WITH SENSING DATA PROCESSING

CROSS-REFERENCE TO RELATED APPLICATIONS

This application claims the benefit under 35 USC § 119(a) of Korean Patent Application No. 10-2021-0141142, filed on Oct. 21, 2021, in the Korean Intellectual Property Office, the entire disclosure of which is incorporated herein by reference for all purposes.

BACKGROUND

1. Field

The following description relates to a method and apparatus with sensing data processing.

2. Description of Related Art

Estimating a two-dimensional (2D) or three-dimensional (3D) pose of an object is an important technique for many vision applications, such as, but not limited to, augmented reality (AR), Closed Circuit Television (CCTV), navigation, control devices, and robot applications.

In recent years, augmented reality technology has attracted more attention. A basic function of augmented reality technology is 3D interaction. 3D interaction refers to displaying augmented information to overlap a 3D object of the real world.

It may be beneficial to include matching augmented information or enhanced information with a 3D pose of a real object to achieve realistic visual effects in 3D interaction. Accordingly, it may be beneficial to obtain 2D or 3D pose information of the real object. The pose information may be obtained through estimation using keypoints.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a sensing data processing device includes a reference sensor configured to generate sensing data by capturing a scene with a field of view (FOV); and a processor configured to: track keypoints within a full observable range of the sensing data processing device based on sensing data collected from a previous frame and sensing data collected from a current frame by the reference sensor, and manage a new keypoint together with the tracked keypoints in response to a detection of the new keypoint, wherein the full observable range is determined based on a combined FOV of the reference sensor and a second sensor.

The processor may be further configured to determine, for at least one partial region in the full observable range, a changed position of a keypoint in the at least one partial region among the tracked keypoints.

The processor may be further configured to determine a changed position of a keypoint of the tracked keypoints based on sensing by the reference sensor, for a region of the FOV of the reference sensor that does not overlap a FOV of the second sensor, and determine a changed position of a keypoint of the tracked keypoints based on sensing by the second sensor, for a region of the FOV of the second sensor that does not overlap the FOV of the reference sensor.

The processor may be further configured to determine a changed position of a keypoint of the tracked keypoints based on sensing by the reference sensor, for a region of the FOV of the reference sensor that overlaps a FOV of the second sensor, and skip tracking a keypoint of the tracked keypoints based on sensing by the second sensor, for a region of the FOV of the second sensor that overlaps the FOV of the reference sensor.

The processor may be further configured to update regions to which the tracked keypoints belong within the full observable range based on changed positions of the tracked keypoints.

The processor may be further configured to exclude a keypoint whose changed position is out of the full observable range, among the tracked keypoints, from tracking.

The processor may be further configured to classify the tracked keypoints as belonging to one of a non-overlapping region and an overlapping region based on a non-overlapping mask that indicates the non-overlapping region, and an overlapping mask that indicates the overlapping region.

The processor may be further configured to remove an outlier from among the tracked keypoints based on the sensing data collected from the previous frame and the sensing data collected from the current frame by the reference sensor.

The processor may be further configured to detect the new keypoint in an overlapping region that overlaps an FOV of the second sensor based on sensing data collected by the reference sensor.

The sensing data processing device may further include an output device configured to output a localization result estimated for the sensing data processing device, wherein the processor may be further configured to estimate at least one of a position and a pose of the sensing data processing device as the localization result based on a result of refining the tracked keypoints.

In a general aspect, a processor-implemented sensing data processing method includes tracking keypoints within a full observable range of a sensing data processing device based on sensing data collected from a previous frame and sensing data collected from a current frame by a reference sensor by capturing a scene with a field of view (FOV); refining the tracked keypoints; and managing a new keypoint together with the tracked keypoints in response to a detection of the new keypoint, wherein the full observable range is determined based on a combined FOV of the reference sensor and a second sensor.

The tracking may include determining, for at least one partial region in the full observable range, a changed position of a keypoint in the at least one partial region among the tracked keypoints.

The tracking may include determining a changed position of a keypoint of the tracked keypoints based on sensing by the reference sensor, for a region of the FOV of the reference sensor that does not overlap a FOV of the second sensor; and determining a changed position of a keypoint of the tracked keypoints based on sensing by the second sensor, for a region of the FOV of the second sensor that does not overlap the FOV of the reference sensor.

The tracking may include determining a changed position of a keypoint of the tracked keypoints based on sensing by the reference sensor, for a region of the FOV of the reference sensor that overlaps a FOV of the second sensor; and skipping tracking a keypoint of the tracked keypoints based on sensing by the second sensor, for a region of the FOV of the second sensor that overlaps the FOV of the reference sensor.

The tracking may include updating regions to which the tracked keypoints belong within the full observable range based on changed positions of the tracked keypoints.

The tracking may include excluding a keypoint whose changed position is out of the full observable range, among the tracked keypoints, from tracking.

The tracking may include classifying the tracked keypoints as belonging to one of a non-overlapping region and an overlapping region based on a non-overlapping mask that indicates the non-overlapping region, and an overlapping mask that indicates the overlapping region.

The refining may include removing an outlier from among the tracked keypoints based on the sensing data collected from the previous frame and the sensing data collected from the current frame by the reference sensor.

The managing may include detecting the new keypoint in an overlapping region that overlaps an FOV of the second sensor based on sensing data collected by the reference sensor.

In a general aspect, a sensing data processing device includes a first sensor, configured to capture a first image with a first field of view (FOV); a second sensor, divergent from the first sensor, and configured to capture a second image with a second FOV; one or more processors, configured to: determine an overlapping area and non-overlapping areas between the first image and the second image; detect keypoints in the overlapping area and the non-overlapping areas; track changes in positions of the keypoints in the overlapping area and the non-overlapping areas for each consecutive frame of the first image and the second image; refine the tracked keypoints by removing an outlier from the tracked keypoints, and manage a new keypoint together with the tracked keypoints in response to a detection of the new keypoint in a current frame.

The new keypoint may be detected in an overlapping region that overlaps an FOV of the second sensor based on sensing data collected by the first sensor.

The sensing data processing device may further include tracking the keypoints in the overlapping region and keypoints in the non-overlapping regions, and applying the tracked keypoints to localization.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have"

specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like elements and a repeated description related thereto will be omitted.

Figure 1:
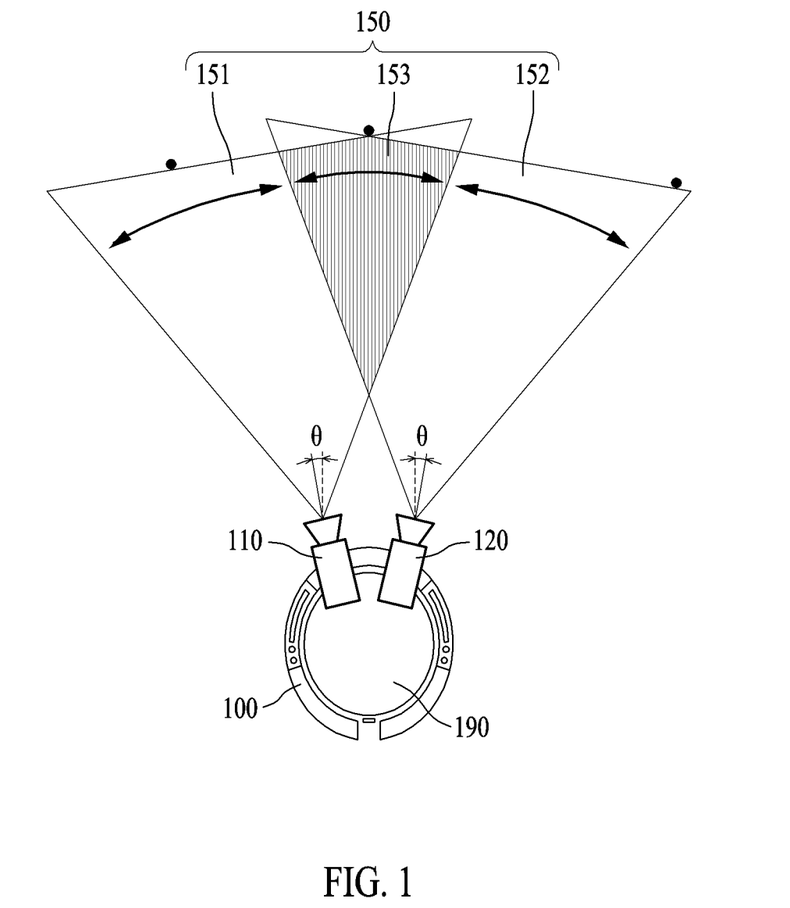
FIG. 1 illustrates an example field of view (FOV) of an example sensor, in accordance with one or more embodiments.

FIG. 1 illustrates an example field of view (FOV) of a sensor, in accordance with one or more embodiments.

A sensing data processing device 100 may perform a task related to localization based on sensing data obtained through sensors. In an example, the sensing data processing device 100 may estimate its position and/or pose based on the sensing data. Herein, a camera sensor will be described as an example of a sensor. However, the examples are not limited thereto. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

FIG. 1 illustrates an example of the sensing data processing device 100 including a pair of camera sensors 110 and 120 (e.g., stereo camera sensors). The sensing data processing device 100 may obtain an image pair (e.g., stereo images) in the same time frame through the stereo camera sensors 110 and 120. The sensing data processing device 100 may calculate a depth from the sensing data processing device 100 to a point in a scene captured by the stereo camera sensors 110 and 120 based on the obtained image pair.

In an example, the stereo camera sensors 110 and 120, which may be disposed in a parallel manner, and whose principal axes may be parallel to each other, may have an overlapping region 153, in which their fields of view (FOVs) overlap, that is wider than non-overlapping regions 151 and 152. The sensing data processing device 100 that implements parallel stereo camera sensors may calculate a depth to a point corresponding to a pixel with respect to the relatively wide overlapping region 153 as described above.

Herein, an example of the sensing data processing device 100 using divergent stereo camera sensors will be mainly described. The divergent stereo camera sensors 110 and 120 may be a pair of camera sensors whose principal axes are disposed non-parallel to each other. In other words, the camera sensors may be disposed to face outward based on lines of sight such that the principal axes thereof diverge. That is, the distance between the principal axes of the camera sensors may increase in a direction away from the camera sensors. In FIG. 1, in an example, the sensing data processing device 100 may be implemented as a head-mounted display (HMD). However, this is only an example, and the sensing data processing device 100 may be implemented as an AR device, a vehicle, a robot, and/or a drone, as non-limiting examples. When the sensing data processing device 100 is mounted on a user 190, the principal axes of the camera sensors may form an angle of a with respect to the lines of sight of the user 190. The divergent stereo camera sensors 110 and 120 may have a narrower overlapping region 153 than parallel stereo camera sensors. On the other hand, the divergent stereo camera sensors 110 and 120 may have wider non-overlapping regions 151 and 152 than the parallel stereo cameras and thus, may provide a relatively wide FOV. Accordingly, the sensing data processing device 100 that implements the divergent stereo camera sensors 110 and 120 may use more image information obtained based on the wide FOV to track its position and/or pose.

For reference, a full observable range 150 of the sensing data processing device 100 may be determined based on a FOV combination of sensors (e.g., a reference sensor 110 and another sensor 120). The FOV combination may be a combination of an overlapping FOV and a non-overlapping FOV between the sensors. As the overlapping region between the FOVs of the sensors decreases and the non-overlapping region increases, the FOV of the sensor combination may increase, and thus, the full observable range 150 may also increase. Conversely, as the overlapping region between the FOVs of the sensors increases and the non-overlapping region decreases, the FOV of the sensor combination may decrease, and thus, the full observable range 150 may also decrease. FIG. 1 illustrates the reference sensor 110, which may be a camera sensor on the left side of the user 190, and the other sensor 120, which may be a camera sensor on the right side of the user 190. However, the examples are not limited thereto. Depending on the examples, the reference sensor 110 may be a camera sensor on the right side, and camera sensors may be arranged along an axis parallel to a ground and another axis (e.g., an axis perpendicular to the ground), where the number of camera sensors may be n. Here, n may be an integer greater than or equal to "2".

Hereinafter, the sensing data processing device 100 that effectively performs localization with respect to divergent stereo camera sensors as well as parallel stereo camera sensors will be described.

Figure 2:
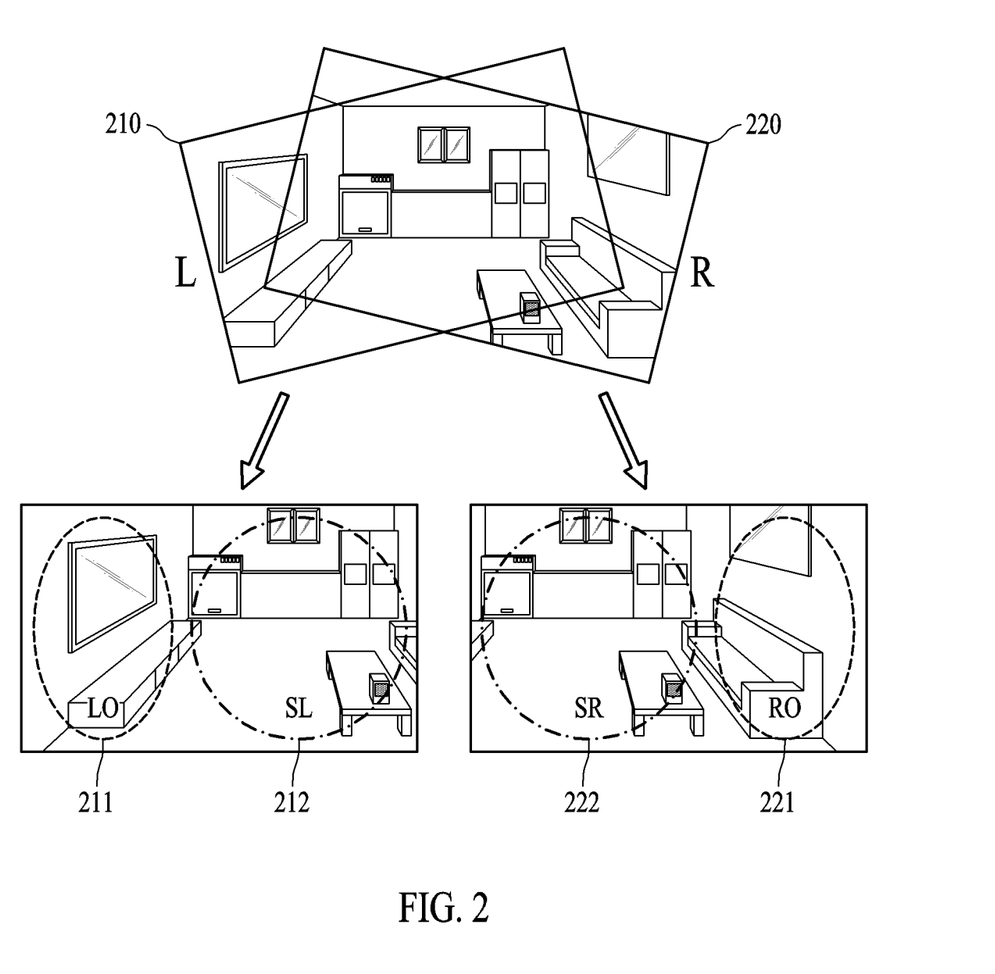
FIG. 2 illustrates an example of discriminating regions in sensing data, in accordance with one or more embodiments.

FIG. 2 illustrates an example of discriminating regions in sensing data, in accordance with one or more embodiments.

When the pair of sensors described above in FIG. 1 may be divergent stereo camera sensors, a sensing data processing device may generate individual images through the camera sensors. In an example, the sensing data processing device 100 may generate a first image 210 through a first camera sensor, and may generate a second image 220 through a second camera sensor.

The sensing data processing device 100 may divide sensing data collected from the sensors into an overlapping region that overlaps a FOV of another sensor and a non-overlapping region that does not overlap the FOV of the other sensor. In an example, the sensing data processing device may obtain the first image 210 (e.g., a left image) through the first camera sensor, for example, camera sensor 110 and the second image 220 (e.g., a right image) through the second camera sensor, for example, camera sensor 120 of the stereo camera sensors 110 and 120. The sensing data processing device 100 may determine, in the first image 210, a region where the FOV of the first camera sensor (for example, camera sensor 110) and the FOV of the second camera sensor (for example, camera sensor 120) overlap to be a first overlapping region 212 (e.g., stereo left (SL)). The sensing data processing device 100 may determine, in the first image 210, a remaining region of the FOV of the first camera sensor that does not overlap the FOV of the second camera sensor to be a first non-overlapping region 211 (e.g., left only (LO)). Likewise, the sensing data processing device may determine, in the second image 220, a region where the FOV of the second camera sensor, (for example, camera sensor 120), and the FOV of the first camera sensor, (for example, camera sensor 110), overlap to be a second overlapping region 222 (e.g., stereo right (SR)). The sensing data processing device may determine, in the second image 220, a remaining region of the FOV of the second camera sensor that does not overlap the FOV of the first camera sensor to be a second non-overlapping region 221 (e.g., right only (RO)). The first overlapping region 212 and the second overlapping region 222 may include the same object and/or background in scenes.

As described above, the sensing data processing device 100 may track and manage keypoints based on the regions obtained by dividing the FOVs of the respective sensors. The sensing data processing device 100 may estimate its position and/or pose based on keypoints within a full observable range while maintaining the tracking of keypoints belonging to the overlapping region and keypoints belonging to the non-overlapping region for each sensor. An operation of the sensing data processing device will be described below.

Figure 3:
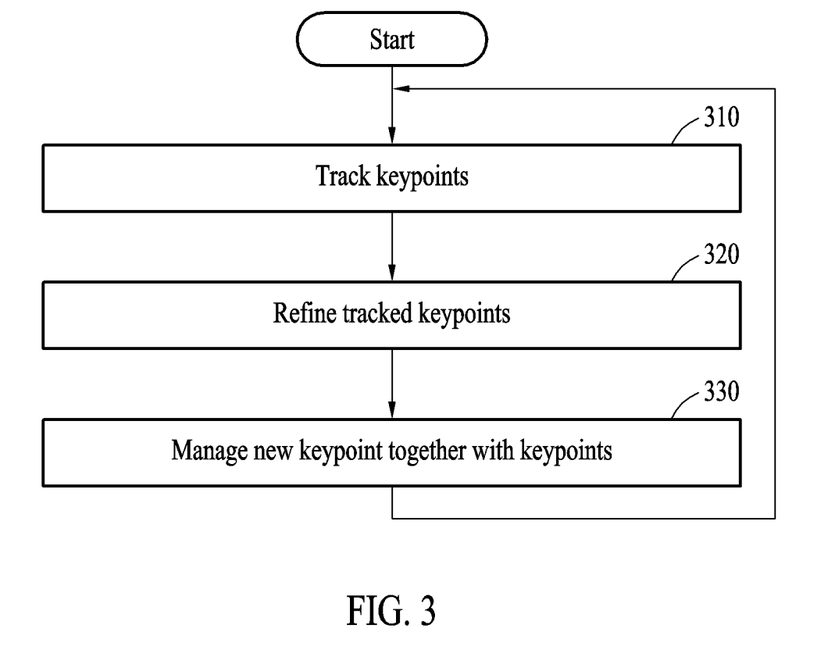
FIG. 3 illustrates an example method of processing sensing data, in accordance with one or more embodiments.

FIG. 3 illustrates an example method of processing sensing data, in accordance with one or more embodiments. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

In an example, a method of estimating a position and/or a pose of a device (e.g., a sensing data processing device) by utilizing camera sensors may include a direct tracking method and an indirect tracking method. The direct tracking method may be a method of estimating the position and/or the pose using all pixel information in image information. The indirect tracking method may be a method of detecting a keypoint in an image and estimating the position and/or the pose of the device using the detected keypoint.

The sensing data processing device may detect a keypoint from sensing data (e.g., image data) collected through sensors. The sensing data processing device may perform indirect localization and/or pose estimation based on the detected keypoint. In the indirect tracking method, the process of estimating the position and/or the pose of the device may improve through keypoint management. For reference, herein, a keypoint is a point that is a standard for localization in sensing data, may be used to estimate changes in the positions and/or the poses of the sensing data processing device and the sensors, and may be, for example, a corner point. A corner point may be a point, in image data, at which two or more edge components intersect or at which a vertex exists. In an example, when a board of a checker pattern is captured through a camera sensor, respective vertices may be extracted as keypoints. The keypoints may also be referred to as landmarks and/or features.

Referring to FIG. 3, in operation 310, the sensing data processing device may track keypoints. In an example, the sensing data processing device may track keypoints within a full observable range based on sensing data collected from a previous frame and a current frame by a reference sensor, the full observable range determined based on a FOV combination of the reference sensor and another sensor. As described above, the sensing data processing device 100 may obtain sensing data corresponding to a frame (e.g., a time frame) from each camera sensor. The sensing data processing device 100 may detect the keypoints from the sensing data of each frame. The sensing data processing device 100 may track changes in the positions of the keypoints and region changes with respect to the frame. Herein, an example of detecting and tracking keypoints for each of consecutive frames is mainly described. However, examples are not limited thereto. An example of tracking keypoints will be described below with reference to FIG. 4.

In operation 320, the sensing data processing device may refine the tracked keypoints. In an example, the sensing data processing device may remove an outlier from the tracked keypoints. An example of removing an outlier will be described below with reference to FIG. 7.

In operation 330, the sensing data processing device may manage a new keypoint together with the tracked or original keypoints. The sensing data processing device may manage a new keypoint together with the tracked or original keypoints in response to the new keypoint being detected. The sensing data processing device may additionally detect a new keypoint in a new frame (e.g., a current frame). In an example, the sensing data processing device may additionally detect a new keypoint based on the oriented FAST and rotated BRIEF (ORB) algorithm and scale-invariant feature transform (SIFT). For ease of description, it has been described that adding a new keypoint according to operation 330 is performed later. However, examples are not limited thereto. Depending on the design, adding a new keypoint may be performed prior to operation 310.

A processor of the sensing data processing device 100 may detect a new keypoint in an overlapping region that overlaps an FOV of another sensor based on sensing data collected through the reference sensor. Since it is possible to detect the keypoint in the overlapping region of the reference sensor and the overlapping region of the other sensor, the sensing data processing device 100 may calculate three-dimensional (3D) coordinates of the new keypoint while detecting the new keypoint. The 3D coordinates of the keypoint may be coordinates according to a world coordinate system and/or a camera coordinate system. In an example, the origin point of the world coordinate system may be set as a point in the space where initial localization begins. As described above, the sensing data processing device 100 may store and manage 3D coordinate values corresponding to the keypoints separately from 2D coordinates (e.g., coordinates on an image plane) of the keypoints. The sensing data processing device 100 may generate and manage a 3D map based on the 3D coordinate values.

In an initial stage of operation, the sensing data processing device 100 may detect and manage new keypoints only for the overlapping region, and the keypoints may be distributed to the remaining non-overlapping regions by movement and/or rotation of the device. After the keypoints are evenly distributed to the overlapping region and the non-overlapping region, the sensing data processing device may stably provide position and/or pose estimation using the keypoints.

As described above, the sensing data processing device 100 may apply the keypoints in the non-overlapping region as well as the keypoints in the overlapping region, thereby having an improved performance of tracking keypoints. In an example, divergent stereo camera sensors may have a relatively narrow overlapping region, and the sensing data processing device 100 may track keypoints in the overlapping region and keypoints in the non-overlapping region, and apply the tracked keypoints to localization, thereby providing stable localization results. Additionally, even when an angular interval between principal axes of the sensors dynamically changes, the sensing data processing device 100 may perform stable localization using all the keypoints in the overlapping region and the keypoints in the non-overlapping region as described above. Camera calibration to match keypoints obtained from the camera sensor may be performed in response to a change in the angular interval between the principal axes of the sensors, or camera calibration parameters corresponding to the changed angle may be loaded from a database built in advance by the sensing data processing device 100.

For reference, herein, sensing through two sensors (e.g., a pair of camera sensors 110 and 120) is mainly described. However, examples are not limited thereto. The sensing data processing device may collect sensing data for each frame through the sensors, and each of the sensors and another sensor may have at least overlapping FOV.

Figure 4:
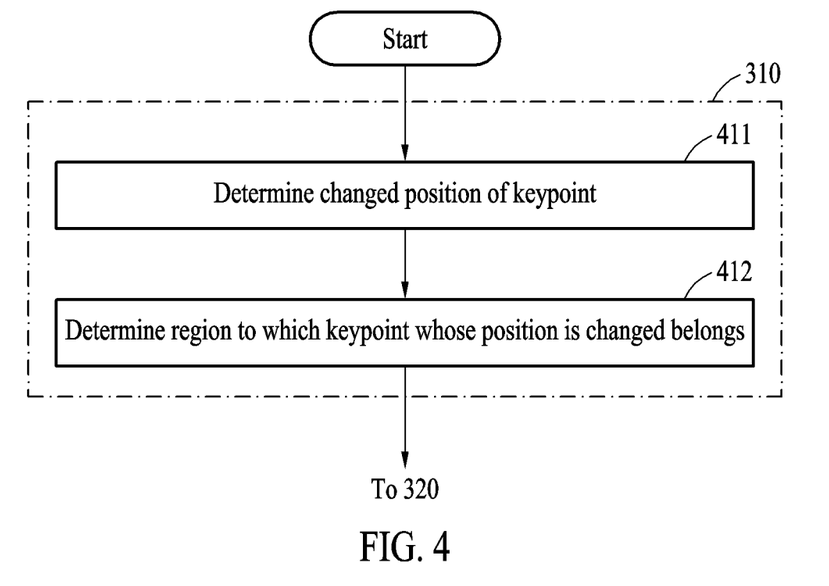
FIG. 4 illustrates an example of tracking a keypoint, in accordance with one or more embodiments.

FIG. 4 illustrates an example of tracking a keypoint, in accordance with one or more embodiments. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

First, in operation 411, a sensing data processing device 100 may determine a changed position of a keypoint. The sensing data processing device 100 may track the movement of a keypoint according to a frame. The sensing data processing device may track, for each keypoint, the movement of the keypoint from a position in a previous frame to a position in a current frame. The sensing data processing device 100 may determine a position, in a current frame, of a keypoint detected in a previous frame. Herein, an example of a previous frame may be a frame immediately before a current frame. However, examples are not limited thereto. The sensing data processing device 100 may track the keypoint until the keypoint is out of the full observable range described above.

The sensing data processing device 100 may track the movement of the keypoint based on an optical flow tracking method (e.g., Kanade-Lucas-Tomasi (KLT) tracking method) which is based on an optical flow between images in two frames. The sensing data processing device 100 may compare keypoints detected in the previous frame to keypoints detected in the current frame. The sensing data processing device may search for corresponding pairs among the keypoints detected in the previous frame and the keypoints detected in the current frame. In an example, the sensing data processing device 100 may obtain an initial guess about a change in the position of a keypoint based on inertial information measured through an inertial measurement unit (IMU), and compensate for the initial guess using the KLT described above.

The sensing data processing device 100 may determine a changed position of a keypoint based on sensing by a reference sensor, for a region of an FOV of the reference sensor that does not overlap a FOV of another sensor. The sensing data processing device 100 may estimate the changed position of the keypoint in the non-overlapping region of the reference sensor from the previous frame to the current frame based on the sensing data of the previous frame and the sensing data of the current frame collected by the reference sensor. The sensing data processing device 100 may determine a changed position of a keypoint based on the sensing by the other sensor, for a region of the FOV of the other sensor that does not overlap the FOV of the reference sensor. Likewise, the sensing data processing device 100 may estimate the changed position of the keypoint in the non-overlapping region of the other sensor from the previous frame to the current frame base on the sensing data of the previous frame and the sensing data of the current frame collected by the other sensor. The sensing data processing device 100 may estimate, for the overlapping region between the sensors, the movement of the keypoint base on sensing data collected by at least one of the reference sensor and the other sensor.

The sensing data processing device 100 may manage keypoint information for each individual keypoint. The keypoint information may include, as non-limiting examples, an identifier (ID), a position in an image (e.g., coordinates on a 2D image plane), and a confidence score of a keypoint (e.g., a score indicating the accuracy of an extracted keypoint).

In operation 412, the sensing data processing device 100 may also update a region to which the corresponding keypoint belongs according to the change in the position of the keypoint. The sensing data processing device 100 may classify the region to which the keypoint belongs as one of an overlapping region of the reference sensor, a non-overlapping region of the reference sensor, an overlapping region of the other sensor, and a non-overlapping region of the other sensor. An example of updating the region to which the keypoint belongs will be described below with reference to FIG. 5.

For reference, the sensing data processing device 100 may track and detect keypoints for all regions within the full observable range. However, examples are not limited thereto. The sensing data processing device 100 may track keypoints for each region of an individual image, and exclude the tracking of keypoints for a partial region. In an example, the sensing data processing device 100 may determine, for at least one partial region in the full observable range, a changed position of a keypoint in the at least one partial region among the keypoints. In other words, a processor of the sensing data processing device 100 may determine a changed position of a keypoint based on sensing by the reference sensor, for a region of the FOV of the reference sensor that overlaps the FOV of the other sensor. The sensing data processing device 100 may skip the tracking of keypoints based on sensing by the other sensor, for a region of the FOV of the other sensor that overlaps the FOV of the reference sensor (e.g., the SR region 222 of FIG. 2). A keypoint appearing in the overlapping region of the other sensor may correspond to a keypoint appearing in the overlapping region of the reference sensor. Therefore, even if the tracking of the corresponding key point in the overlapping region of the other sensor is omitted, the changed position of the corresponding key point in the overlapping region of the other sensor may be estimated through a result of tracking (e.g., a change in the position) of the keypoint in the overlapping region of the reference sensor.

In an example, the sensing data processing device 100 may calculate a position corresponding to a point based on the sensing by the reference sensor described above within an image plane of the other sensor, based on a camera parameter (e.g., an intrinsic parameter) between the reference sensor and the other sensor. Tracking the changed position of the keypoint in the overlapping region of the other sensor may be performed in a refinement operation, which will be described later with reference to FIG. 7. In other words, tracking the keypoint described with reference to FIG. 4 for the overlapping region of the other sensor may be omitted, and the changed position of the keypoint in the overlapping region of the other sensor may be estimated by tracking based on the sensing by the reference sensor in the keypoint refinement operation, which will be described later with reference to FIG. 7. However, this is only an example and is not intended to limit the order of determining the changed position of the keypoint in the overlapping region of the other sensor, and may be performed in parallel and/or in time series with other operations.

Figure 5:
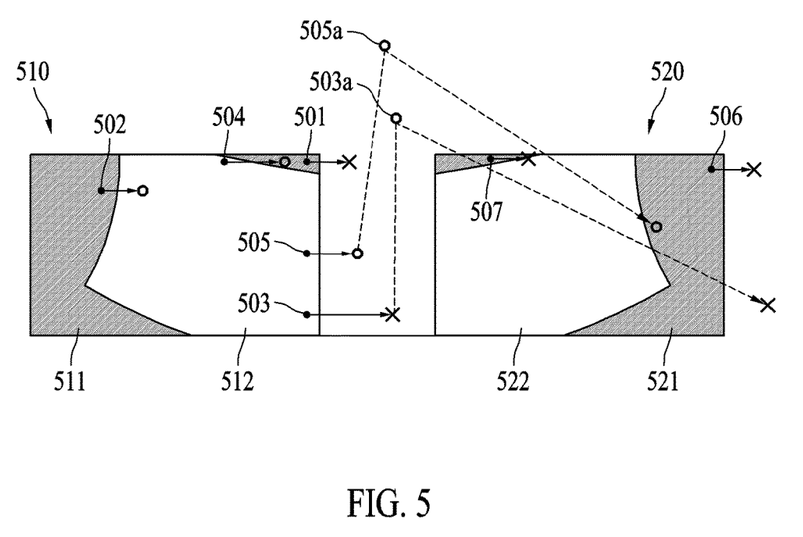
FIG. 5 illustrates an example of determining a region according to a change in a position of a keypoint, in accordance with one or more embodiments.

FIG. 5 illustrates an example of determining a region according to a change in a position of a keypoint, in accordance with one or more embodiments.

A processor of a sensing data processing device may update regions to which respective keypoints belong within a full observable range based on changed positions of the keypoints. In FIG. 5, a position of a keypoint may be a position according to an image coordinate system of a first image 510 and/or a position according to an image coordinate system of a second image 520.

In an example, the sensing data processing device may exclude a keypoint whose changed position is out of the full observable range, among tracked keypoints, from tracking. The sensing data processing device may remove a keypoint that is out of an observable range (e.g., the full observable range) among the tracked keypoints from keypoint management. In an example, FIG. 5 illustrates the movement of a keypoint for each region of an image according to a frame. In FIG. 5, a keypoint 503 in an overlapping region 512 and a keypoint 501 in a non-overlapping region 511 of the first image 510 may deviate from the full observable range based on the movement of the frame. A keypoint 506 in a non-overlapping region 521 of the second image 520 may also deviate from the full observable range based on the movement of the frame. Accordingly, the sensing data processing device may remove the keypoints 501, 503, and 506 that are out of the observable range corresponding to the first image 510 and the second image 520. A changed position of the keypoint 503 may be transformed from coordinates in the first image 510 to coordinates in the second image 520 based on corresponding 3D coordinates 503a and/or camera parameters.

In an example, a keypoint 507 having moved from the non-overlapping region 521 to an overlapping region 522 of the second image 520 may be removed for management efficiency. Instead, the sensing data processing device 100 may generate a keypoint corresponding to the removed keypoint 507 in the overlapping region 512 of the first image 510. As described above in FIG. 4, keypoints in the overlapping regions 512 and 522 may be transformed to positions corresponding to the other sensor through the camera parameters. Thus, the sensing data processing device 100 may maintain the keypoints only for one of the two sensors.

When the keypoint deviates from a boundary of the region to which the keypoint belongs in a previous frame and enters another region within the full observable range in a current frame, the processor of the sensing data processing device 100 may update the region to which the keypoint belongs with the other region. In an example, the sensing data processing device may classify a detected keypoint as belonging to one of the regions (e.g., the LO region, the SL region, the SR region, and the RO region of FIG. 2). In an example, an LO keypoint may be a keypoint positioned in a first non-overlapping region of a first image obtained through a first camera sensor (e.g., a left camera sensor). An SL keypoint may be a keypoint positioned in a first overlapping region in the first image. An SR keypoint may be a keypoint positioned in a second overlapping region of a second image obtained through a second camera sensor (e.g., a right camera sensor). An RO keypoint may be a keypoint positioned in a second non-overlapping region of the second image. In an example, herein, an example of the first image being a reference image and the second image being another image is an example. However, examples are not limited thereto.

In an example, the sensing data processing device may determine that a keypoint 502 having moved from the non-overlapping region 511 to the overlapping region 512 of the first image 510 belongs to the overlapping region 512. The sensing data processing device may determine that a changed position of a keypoint 505 having belonged to the overlapping region 512 of the first image 510, belongs to the non-overlapping region 521 of the second image 520. The sensing data processing device may calculate corresponding coordinates in the second image 520 from world coordinates 505a corresponding to the keypoint 505, or calculate corresponding coordinates in the second image 520 based on the camera parameters. The sensing data processing device may update a region of a keypoint 504 having moved from the overlapping region 512 of the first image 510 to the non-overlapping region 511 of the first image 510. Classifying the position of the keypoint described with reference to FIG. 5 may be efficiently performed through a mask, which will be described later with reference to FIG. 6.

Figure 6:
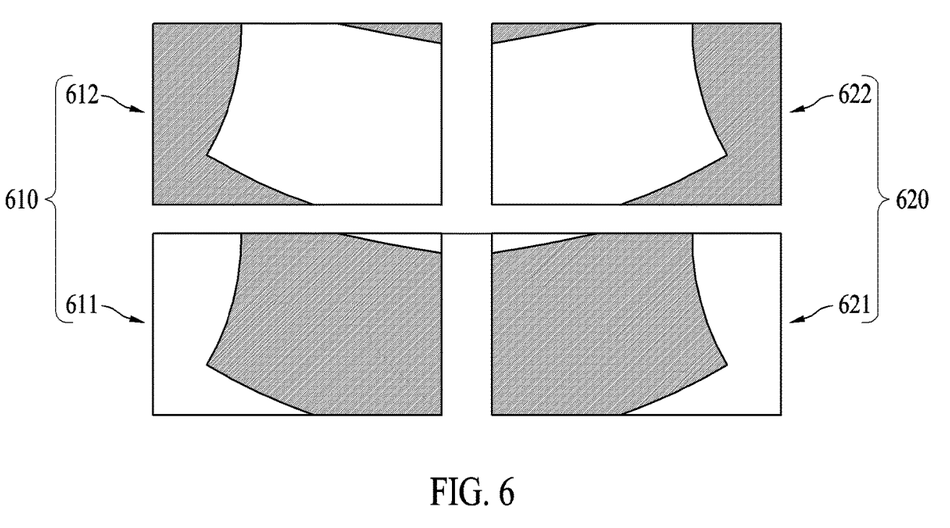
FIG. 6 illustrates an example of a mask for determining a region of a keypoint, in accordance with one or more embodiments.

FIG. 6 illustrates an example of a mask to determine a region of a keypoint, in accordance with one or more embodiments.

A processor of a sensing data processing device may classify keypoints as belonging to one of a non-overlapping region and an overlapping region based on a non-overlapping mask indicating the non-overlapping region and an overlapping mask indicating the overlapping region. The non-overlapping mask may be a mask having an activation value (e.g., "1") for a region of an FOV of a sensor (e.g., a reference sensor) that does not overlap an FOV of another sensor and having a deactivation value (e.g., "0") for the other region. The overlapping mask may be a mask having an activation value (e.g., "1") for a region of the FOV of the sensor that overlaps the FOV of the other sensor and having a deactivation value (e.g., "0") for the other region. In FIG. 6, the activation values are shown as bright, and the deactivation values are shown as dark. Masks 610 for a first sensor (e.g., a reference sensor) may include an overlapping mask 612 and a non-overlapping mask 611. Masks 620 for a second sensor (e.g., another sensor) may include an overlapping mask 622 and a non-overlapping mask 621. The sensing data processing device may apply the masks set for each sensor to a keypoint whose position is changed. Each mask may be predefined based on calibration information (e.g., camera parameters) between the sensors, an FOV, a distance, and a distortion.

The sensing data processing device may individually apply pixel-wise multiplication to coordinates of one or more keypoints whose changes in position are tracked for each sensor based on the masks 611, 612, 621, and 622. It may be determined that a keypoint multiplied by an activation value of a mask indicating one region may belong to the corresponding region. As described above, the sensing data processing device may determine and transform a region to which a keypoint belongs by utilizing a predefined mask, thereby updating a change in the region of the keypoint at a small amount of computation.

Figure 7:
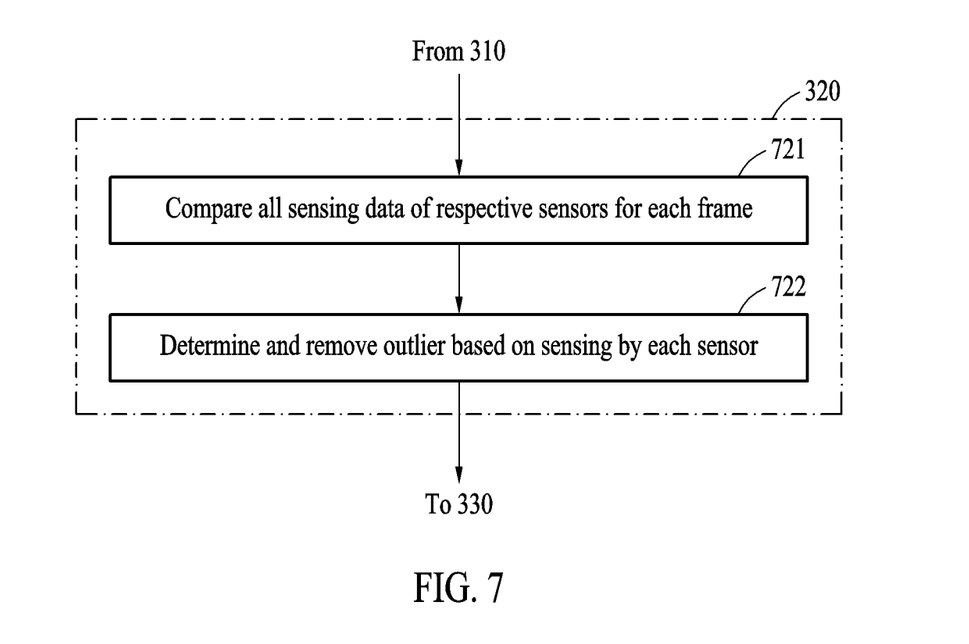
FIG. 7 illustrates an example of refining a keypoint, in accordance with one or more embodiments.

FIG. 7 illustrates an example of refining a keypoint. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

A sensing data processing device may remove an outlier from among keypoints based on sensing data collected from a previous frame and a current frame through a reference sensor. The outlier may be a keypoint whose position is incorrectly calculated due to a sensor error and/or a computational error, among the keypoints. The outlier may degrade performance in estimating a position and/or a pose of the device and thus, may be removed as described below.

In an example, in operation 721, the sensing data processing device may compare all sensing data of the respective sensors for each frame. In an example, the sensing data processing device may compare the sensing data for each frame through algorithms such as, but not limited to, random sample consensus (RANSAC) and stereo matching. The sensing data processing device may compare sensing data collected by one sensor for each frame by integration without discriminating regions. In an example, the sensing data processing device may compare a keypoint appearing in sensing data of a previous frame and a keypoint appearing in sensing data of a current frame of a first sensor. The sensing data processing device may compare a keypoint appearing in sensing data of a previous frame and a keypoint appearing in sensing data of a current frame of a second sensor. In other words, the sensing data processing device may compare the keypoints by integrating, for each frame, an overlapping region and a non-overlapping region of the first sensor and integrating an overlapping region and a non-overlapping region of the second sensor. For reference, in an example of skipping tracking keypoints in the overlapping region of the second sensor, the sensing data processing device may use a copying result obtained by transforming a keypoint in the overlapping region of the first sensor to coordinates of the second sensor for the comparison for removing an outlier. In an example, in the RANSAC algorithm, outlier detection performance increases as the number of samples increases. As described above, by integrating the overlapping region and the non-overlapping region, keypoints to be compared may be sufficiently secured.

However, examples are not limited to the example of performing a comparison between keypoints for each frame by integrating the overlapping region and the non-overlapping region as described above. In an example, as the movement increases, a probability of an outlier occurring may increase. Thus, it may be interpreted as a high probability of an outlier occurring in the non-overlapping region of each sensor. The sensing data processing device may perform an efficient operation by performing the comparison between keypoints for each frame for the non-overlapping region of each sensor.

In operation 722, the sensing data processing device may determine and remove an outlier based on sensing by each sensor. As described above, the sensing data processing device may remove a keypoint determined to be an outlier through algorithms such as RANSAC and stereo matching.

Figure 8:
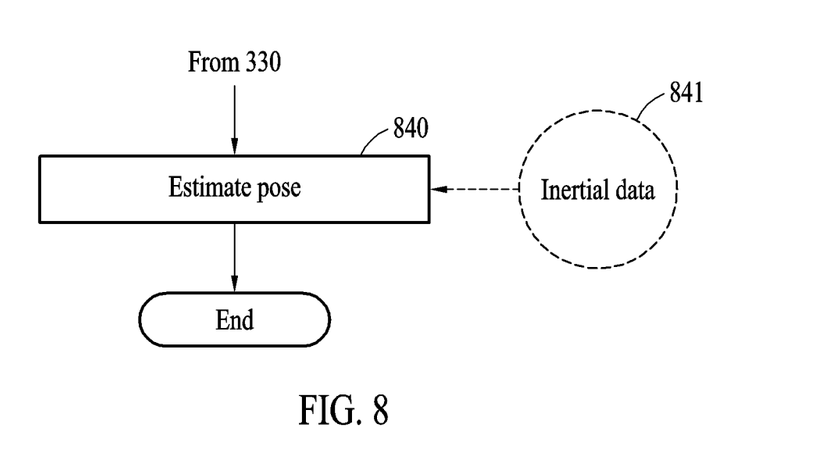
FIG. 8 illustrates an example of utilizing a keypoint, in accordance with one or more embodiments.

FIG. 8 illustrates an example of utilizing a keypoint, in accordance with one or more embodiments.

Referring to FIG. 8, in operation 840, a sensing data processing device may estimate a pose. The sensing data processing device may estimate at least one of a position and a pose of the sensing data processing device as a localization result based on a result of refining a tracked keypoint. In other words, the sensing data processing device may estimate the position and the pose of the device using the remaining keypoints except for the outlier from among the keypoints. The sensing data processing device may perform odometry based on the refined keypoints. The sensing data processing device may output a localization result estimated for the sensing data processing device.

In an example, the sensing data processing device may estimate the position and/or the pose of the sensing data processing device further based on inertial data 841 together with the keypoints described above.

The sensing data processing device may perform localization in view of both the keypoints in the overlapping region and the keypoints in the non-overlapping region of each camera sensor as described above, thereby providing stable tracking performance even for a sudden rotation (e.g., a quick rotation of the head of a user who is wearing augmented reality (AR) glasses).

Figure 9:
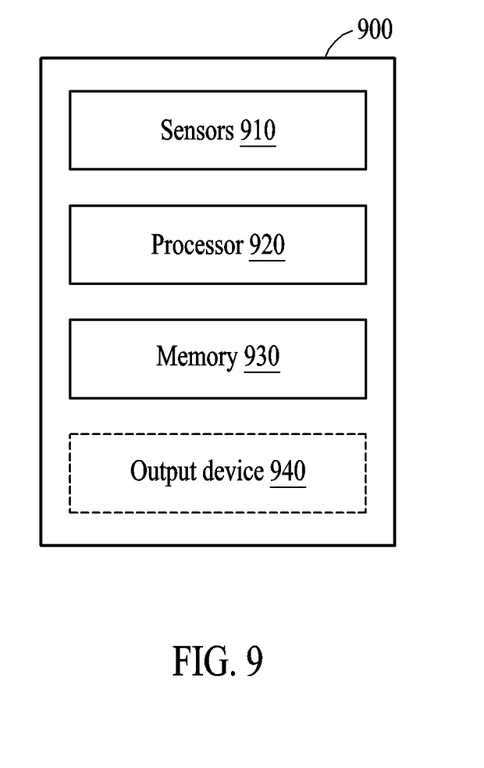
FIG. 9 illustrates an example device for processing sensing data, in accordance with one or more embodiments.

FIG. 9 illustrates an example sensing data processing device, in accordance with one or more embodiments.

Referring to FIG. 9, a sensing data processing device 900 may include sensors 910, one or more processors 920 and one or more memories 930. The sensing data processing device 900 may further include an output device 940.

The sensors 910 may generate sensing data by capturing scenes corresponding to FOVs. In an example, the sensors 910 may include, as non-limiting examples, one of camera sensors, infrared sensors, radar sensors, lidar sensors, and ultrasonic sensors, or a combination of two or more thereof. The sensing data processing device 900 may include a pair of sensors. In an example, when the sensors 910 are camera sensors, the camera sensors may generate image data by capturing scenes with FOVs. As another example, when the sensors 910 are infrared sensors, the infrared sensors may generate infrared data by capturing scenes with FOVs.

The one or more processors 920 may track keypoints within a full observable range based on sensing data collected from a previous frame and a current frame by a reference sensor, the full observable range determined based on a FOV combination of the reference sensor and another sensor. The one or more processors 920 may manage a new keypoint together with the tracked keypoints in response to the new keypoint being detected. However, the operation of the one or more processors 920 is not limited thereto, and the one or more processors 920 may perform the operations described above with reference to FIGS. 1 to 8 in parallel and/or in time series.

The one or more memories 930 may store information needed for managing the keypoints and localization using the keypoints. In an example, the one or more memories 930 may store data indicating the positions of the keypoints, the regions to which the keypoints belong, and the position and/or the pose estimated with respect to the sensing data processing device 900.

The output device 940 may output the above-described localization result (e.g., the position and/or the pose estimated with respect to the sensing data processing device 900). In a non-limiting example, the output device 940 may output the localization result visually, tactilely, and/or audibly. In an example, when the sensing data processing device 900 is implemented as an augmented reality device 900, the output device 940 may be an augmented reality display and may output the localization result visually. As another example, the sensing data processing device 900 may output virtual content to a position determined based on the localization result (e.g., a position overlaid on a targeted real object).

The one or more processors 920 may control another operation of the sensing data processing device 900 based on the above-described localization result. In an example, when the sensing data processing device 900 is implemented as a vehicle, a robot, and/or a drone, the one or more processors 920 may change one of steering, speed, and acceleration of the device 900 or a combination of two or more thereof based on the localization result.

The sensing data processing device 900 may be implemented as a device 900 including a HMD in an augmented reality (AR) environment and may estimate the position and/or the pose of the sensing processing device 900. However, examples are not limited thereto, and the sensing data processing device 900 may be implemented as a robot or a drone. The sensing data processing device 900 may be applied to a chip mounted on the AR device 900 (e.g., AR glasses), a robot, a drone, and a vehicle, software, or a web service implemented thereon.

The sensing data processing device 100, sensing data processing device 900, sensors 910, processor 920, memory 930, output device 940, as well as the remaining apparatuses, units, modules, devices, and other components, described herein may be implemented by hardware components and software components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A sensing data processing device, comprising:
a reference sensor configured to generate sensing data by capturing a scene with a field of view (FOV); and
a processor configured to:
track keypoints within a full observable range of the sensing data processing device based on sensing data collected from a previous frame and sensing data collected from a current frame by the reference sensor, and
manage a new keypoint together with the tracked keypoints in response to a detection of the new keypoint,
wherein the full observable range is determined based on a combined FOV of the reference sensor and a second sensor, and
wherein the processor is further configured to update which region the tracked keypoints belong to within the full observable range based on changed positions of the tracked keypoints.

2. The sensing data processing device of claim 1, wherein the processor is further configured to determine, for at least one partial region in the full observable range, a changed position of a keypoint in the at least one partial region among the tracked keypoints.

3. The sensing data processing device of claim 1, wherein the processor is further configured to:
determine a changed position of a keypoint of the tracked keypoints based on sensing by the reference sensor, for a region of the FOV of the reference sensor that does not overlap a FOV of the second sensor, and
determine a changed position of a keypoint of the tracked keypoints based on sensing by the second sensor, for a region of the FOV of the second sensor that does not overlap the FOV of the reference sensor.

4. The sensing data processing device of claim 1, wherein the processor is further configured to:
determine a changed position of a keypoint of the tracked keypoints based on sensing by the reference sensor, for a region of the FOV of the reference sensor that overlaps a FOV of the second sensor, and
skip tracking a keypoint of the tracked keypoints based on sensing by the second sensor, for a region of the FOV of the second sensor that overlaps the FOV of the reference sensor.

5. The sensing data processing device of claim 1, wherein the processor is further configured to exclude a keypoint whose changed position is out of the full observable range, among the tracked keypoints, from tracking.

6. The sensing data processing device of claim 1, wherein the processor is further configured to classify the tracked keypoints as belonging to one of a non-overlapping region and an overlapping region based on a non-overlapping mask that indicates the non-overlapping region, and an overlapping mask that indicates the overlapping region.

7. The sensing data processing device of claim 1, wherein the processor is further configured to remove an outlier from among the tracked keypoints based on the sensing data collected from the previous frame and the sensing data collected from the current frame by the reference sensor.

8. The sensing data processing device of claim 1, wherein the processor is further configured to detect the new keypoint in an overlapping region that overlaps an FOV of the second sensor based on sensing data collected by the reference sensor.

9. The sensing data processing device of claim 1, further comprising:
an output device configured to output a localization result estimated for the sensing data processing device,
wherein the processor is further configured to estimate at least one of a position and a pose of the sensing data processing device as the localization result based on a result of refining the tracked keypoints.

10. A processor-implemented sensing data processing method, the method, comprising:
tracking keypoints within a full observable range of a sensing data processing device based on sensing data collected from a previous frame and sensing data collected from a current frame by a reference sensor by capturing a scene with a field of view (FOV);
refining the tracked keypoints; and
managing a new keypoint together with the tracked keypoints in response to a detection of the new keypoint,
wherein the full observable range is determined based on a combined FOV of the reference sensor and a second sensor, and wherein the tracking comprises updating which region the tracked keypoints belong to within the full observable range based on changed positions of the tracked keypoints.

11. The sensing data processing method of claim 10, wherein the tracking comprises determining, for at least one partial region in the full observable range, a changed position of a keypoint in the at least one partial region among the tracked keypoints.

12. The sensing data processing method of claim 10, wherein the tracking comprises:
  determining a changed position of a keypoint of the tracked keypoints based on sensing by the reference sensor, for a region of the FOV of the reference sensor that does not overlap a FOV of the second sensor; and
  determining a changed position of a keypoint of the tracked keypoints based on sensing by the second sensor, for a region of the FOV of the second sensor that does not overlap the FOV of the reference sensor.

13. The sensing data processing method of claim 10, wherein the tracking comprises:
  determining a changed position of a keypoint of the tracked keypoints based on sensing by the reference sensor, for a region of the FOV of the reference sensor that overlaps a FOV of the second sensor; and
  skipping tracking a keypoint of the tracked keypoints based on sensing by the second sensor, for a region of the FOV of the second sensor that overlaps the FOV of the reference sensor.

14. The sensing data processing method of claim 10, wherein the tracking comprises excluding a keypoint whose changed position is out of the full observable range, among the tracked keypoints, from tracking.

15. The sensing data processing method of claim 10, wherein the tracking comprises classifying the tracked keypoints as belonging to one of a non-overlapping region and an overlapping region based on a non-overlapping mask that indicates the non-overlapping region, and an overlapping mask that indicates the overlapping region.

16. The sensing data processing method of claim 10, wherein the refining comprises removing an outlier from among the tracked keypoints based on the sensing data collected from the previous frame and the sensing data collected from the current frame by the reference sensor.

17. The sensing data processing method of claim 10, wherein the managing comprises detecting a new keypoint in an overlapping region that overlaps an FOV of the second sensor based on sensing data collected by the reference sensor.

18. A non-transitory computer-readable storage medium storing instructions that, when executed by one or more processors, cause the one or more processors to perform the sensing data processing method of claim 10.

19. A sensing data processing device, comprising:
  a first sensor, configured to capture a first image with a first field of view (FOV);
  a second sensor, divergent from the first sensor, and configured to capture a second image with a second FOV;
  one or more processors, configured to:
    determine an overlapping area and non-overlapping areas between the first image and the second image;
    detect keypoints in the overlapping area and the non-overlapping areas;
    track changes in positions of the keypoints in the overlapping area and the non-overlapping areas for each consecutive frame of the first image and the second image;
    refine the tracked keypoints by removing an outlier from the tracked keypoints, and
    manage a new keypoint together with the tracked keypoints in response to a detection of the new keypoint in a current frame.

20. The sensing data processing device of claim 19, wherein the new keypoint is detected in an overlapping region that overlaps an FOV of the second sensor based on sensing data collected by the first sensor.

21. The sensing data processing device of claim 19, further comprising tracking the keypoints in the overlapping region and keypoints in the non-overlapping regions, and applying the tracked keypoints to localization.

* * * * *